US011868065B2

(12) United States Patent
Takano

(10) Patent No.: US 11,868,065 B2
(45) Date of Patent: Jan. 9, 2024

(54) TONER CONVEYING DEVICE, CLEANING DEVICE, PROCESS CARTRIDGE, AND IMAGE FORMING APPARATUS

(71) Applicant: Kuniyori Takano, Tokyo (JP)

(72) Inventor: Kuniyori Takano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/772,871

(22) PCT Filed: Jan. 22, 2021

(86) PCT No.: PCT/IB2021/050478
§ 371 (c)(1),
(2) Date: Apr. 28, 2022

(87) PCT Pub. No.: WO2021/152434
PCT Pub. Date: Aug. 5, 2021

(65) Prior Publication Data

US 2022/0397842 A1 Dec. 15, 2022

(30) Foreign Application Priority Data

Jan. 29, 2020 (JP) ................................ 2020-012458

(51) Int. Cl.
*G03G 21/10* (2006.01)
*G03G 15/08* (2006.01)
*G03G 21/00* (2006.01)

(52) U.S. Cl.
CPC ..... *G03G 15/0891* (2013.01); *G03G 21/0011* (2013.01); *G03G 21/105* (2013.01); *G03G 15/0889* (2013.01); *G03G 2221/1624* (2013.01)

(58) Field of Classification Search
CPC ........... G03G 15/0891; G03G 21/0011; G03G 21/0076; G03G 2221/001; G03G 21/105;
(Continued)

(56) References Cited

U.S. PATENT DOCUMENTS

2010/0143011 A1* 6/2010 Tawada ................ G03G 21/007 399/358
2013/0108341 A1* 5/2013 Ikebata ................ G03G 21/105 399/358
(Continued)

FOREIGN PATENT DOCUMENTS

JP 2005-077675 3/2005
JP 2008-158170 7/2008
(Continued)

OTHER PUBLICATIONS

International Search Report dated Mar. 25, 2021 in PCT/IB2021/050478 filed on Jan. 22, 2021.
(Continued)

*Primary Examiner* — Arlene Heredia
*Assistant Examiner* — Laura Roth
(74) *Attorney, Agent, or Firm* — Harness, Dickey & Pierce, P.L.C.

(57) ABSTRACT

A toner conveying device includes a conveying screw and a swinging member. The conveying screw includes a shaft portion and a screw portion spirally wound around the shaft portion. The swinging member has a substantially comb shape and swings between the shaft portion and the screw portion with rotation of the conveying screw, and includes a plurality of overhanging portions arranged side by side at intervals in an axial direction of the conveying screw and a plurality of tip portions, each one of which is bent at a predetermined angle from a free end side of a corresponding one of the plurality of overhanging portions in a direction away from the shaft portion. A width of each one of the plurality of tip portions gradually increases at least from a portion to contact the screw portion toward a free end side of each one of the plurality of tip portions.

16 Claims, 5 Drawing Sheets

(58) Field of Classification Search
CPC ....... G03G 2221/0089; G03G 15/0889; G03G 21/10; G03G 2221/1624
See application file for complete search history.

(56) References Cited

U.S. PATENT DOCUMENTS

| | | | | |
|---|---|---|---|---|
| 2015/0063887 | A1* | 3/2015 | Asaoka ................ | G03G 21/105 399/353 |
| 2016/0342129 | A1 | 11/2016 | Matsumoto et al. | |
| 2017/0269511 | A1 | 9/2017 | Tomita et al. | |
| 2018/0032025 | A1 | 2/2018 | Imanaka et al. | |
| 2019/0286011 | A1 | 9/2019 | Nieda et al. | |
| 2020/0174399 | A1 | 6/2020 | Ohkubo et al. | |
| 2020/0183301 | A1 | 6/2020 | Takano et al. | |

FOREIGN PATENT DOCUMENTS

| | | |
|---|---|---|
| JP | 2016-218421 | 12/2016 |
| JP | 2017-167491 | 9/2017 |
| JP | 2018-017932 A | 2/2018 |

OTHER PUBLICATIONS

Office Action dated Oct. 3, 2023 issued in corresponding Japanese Patent Application No. 2020-012458.

* cited by examiner

TONER CONVEYING DEVICE, CLEANING DEVICE, PROCESS CARTRIDGE, AND IMAGE FORMING APPARATUS

CROSS-REFERENCE TO RELATED APPLICATIONS

This application is a national phase under 35 U.S.C. § 371 of PCT International Application No. PCT/IB2021/050478 which has an International filing date of Jan. 22, 2021, which claims priority to Japanese Application No. 2020-012458, filed Jan. 29, 2020, the entire contents of each of which are hereby incorporated by reference.

TECHNICAL FIELD

Aspects of the present disclosure relate to a toner conveying device conveying toner such as waste toner, a cleaning device including the toner conveying device, a process cartridge including the cleaning device, and an electrophotographic image forming apparatus such as a copying machine, a printer, a facsimile machine, or a multifunction peripheral of the foregoing machines.

BACKGROUND ART

In an image forming apparatus using an electrophotographic method such as a copying machine and a printer, there is known a technique in which a toner conveying device conveying toner such as waste toner is disposed in a cleaning device.

In PTL 1, a technique, for installing a comb-shaped agitator (swinging member) that swings between a shaft portion and a spiral blade (screw portion) of the conveying screw, to prevent the agglomeration of toner conveyed by the conveying screw in the cleaning device. For more details, the agitator includes a plurality of overhanging portions arranged side by side at intervals in the axial direction of the agitator and a plurality of bending portions (tip portions) that bend from the free end sides of the plurality of overhanging portions.

In the technique of PTL 1, a comb-shaped swinging member that swings between a shaft portion and a screw portion of the conveying screw is provided to stir the toner in the devices, an effect of reducing the failure of the toner agglomeration in the devices can be greatly expected.

However, in the technique such as PTL 1, may cause a problem in which the swinging member (agitator) is caught in the conveying screw. If the above-described inconvenience occurs, failures such as device drive lock and damage of the swinging member may occur.

CITATION LIST

Patent Literature

[PTL 1]
Japanese Patent No. JP-6638495-B (JP-2017-167491-A)

SUMMARY OF INVENTION

Technical Problem

An object of the present disclosure is to provide a toner conveyance device, a cleaning device, a process cartridge, and an image forming apparatus that can prevent the swinging member from being caught in the conveying screw and reduce the failure of toner agglomeration in the devices.

Solution to Problem

According to an aspect of the present disclosure, a toner conveying device includes a conveying screw and a swinging member. The conveying screw rotates in a predetermined direction and convey toner, and includes a shaft portion and a screw portion spirally wound around the shaft portion. The swinging member has a substantially comb shape and swings between the shaft portion and the screw portion with rotation of the conveying screw, and includes a plurality of overhanging portions arranged side by side at intervals in an axial direction of the conveying screw and a plurality of tip portions, each one of which is bent at a predetermined angle from a free end side of a corresponding one of the plurality of overhanging portions in a direction away from the shaft portion. A width of each one of the plurality of tip portions in the axial direction of the conveying screw gradually increases at least from a portion to contact the screw portion toward a free end side of each one of the plurality of tip portions.

Advantageous Effects of Invention

According to aspects of the present disclosure, there can be provided a toner conveying device, a cleaning device, a process cartridge, and an image forming apparatus that can prevent the swinging member from being caught in the conveying screw and reduce the failure of toner agglomeration in the devices.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
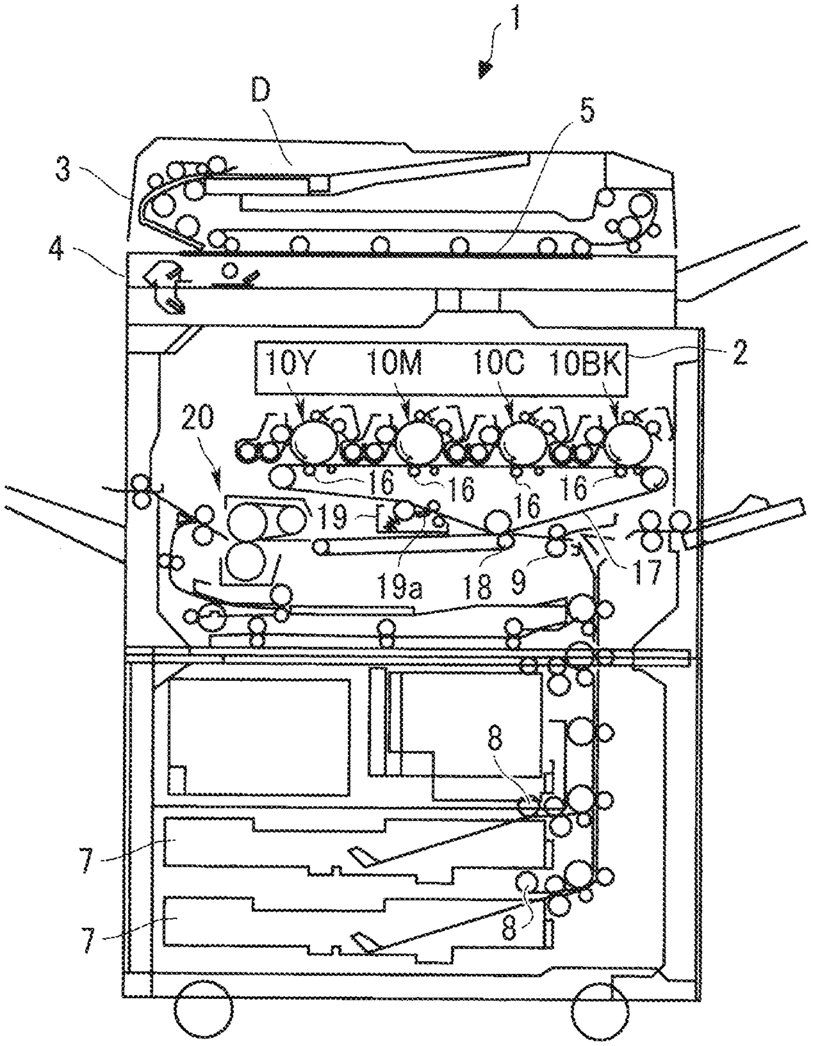
FIG. 1 is a schematic view illustrating an overall configuration of an image forming apparatus according to an embodiment of the present disclosure.

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described in detail with reference to drawings. In the drawings, the same or corresponding parts are denoted by the same reference numerals, and redundant description thereof are simplified or omitted as appropriate.

Figure 2:
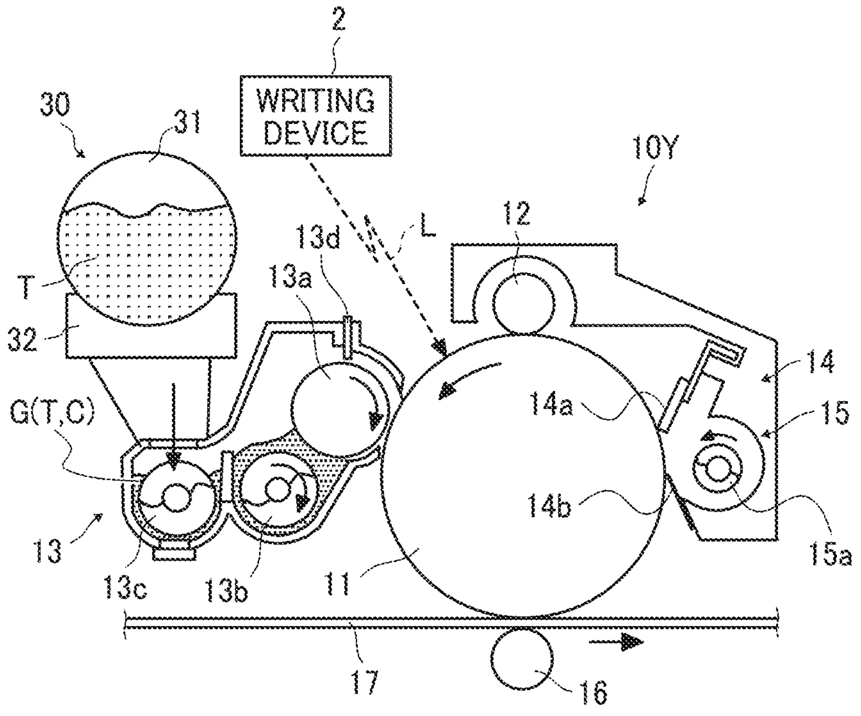
FIG. 2 is a schematic view of a process cartridge of the image forming apparatus and the vicinity of the process cartridge.

First, with reference to FIGS. 1 and 2, a description is given of the overall configuration and operation of an image forming apparatus 1. FIG. 1 is a schematic view illustrating a configuration of the image forming apparatus 1 according to an embodiment of the present disclosure. FIG. 2 is a cross-sectional view illustrating a configuration of a process cartridge 10Y (serving as an image forming unit) for yellow installed in the image forming apparatus 1 of FIG. 1. It is to be noted that the four process cartridges 10Y, 10M, 10C, and 10BK (serving as image forming units) have substantially the same configuration except for the colors of toner used in image forming processes. Therefore, only the process cartridge 10Y is illustrated as a representative in FIG. 2.

In FIG. 1, the image forming apparatus 1, which is illustrated as a tandem-type color copier in the present embodiment, includes a writing device 2, a document feeder 3, and a scanner 4 (serving as a document reading device). The writing device 2 emits a laser beam based on input image data. The document feeder 3 feeds a document D to the scanner 4. The scanner 4 reads image data from the document D. The image forming apparatus 1 further includes a sheet feeder 7 (in this case, a plurality of sheet feeders 7), a registration roller pair 9, and the four process cartridges 10Y, 10M, 10C, and 10BK (serving as image forming units). The sheet feeder 7 accommodates a stack of sheets such as paper sheets. The registration roller pair 9 adjusts a conveyance timing of a sheet. The process cartridges 10Y, 10M, 10C, and 10BK form toner images of yellow, magenta, cyan, and black, respectively. The image forming apparatus 1 further includes primary transfer rollers 16 and an intermediate transfer belt 17. The toner images formed on photoconductor drums 11 (see FIG. 2) of the respective process cartridges 10Y, 10M, 10C, and 10BK are transferred to and overlapped one on another on the intermediate transfer belt 17 by the primary transfer rollers 16, thereby forming a multicolor toner image. The image forming apparatus 1 further includes a secondary transfer roller 18, a belt cleaning blade 19*a*, and a fixing device 20. The secondary transfer roller 18 transfers the multicolor toner image on the intermediate transfer belt 17 onto the sheet. The belt cleaning blade 19*a* cleans the intermediate transfer belt 17. The fixing device 20 fixes the multicolor toner image (unfixed image) on the sheet.

A description is provided below of the operation of the image forming apparatus 1 when forming a normal color image. The document feeder 3 feeds, with conveyance rollers, the document D from a document table onto an exposure glass 5 of the scanner 4. Then, the scanner 4 optically reads image data from the document D set on the exposure glass 5. The yellow, magenta, cyan, and black image data are transmitted to the writing device 2. The writing device 2 irradiates the photoconductor drums 11 (serving as image bearers) of the corresponding process cartridges 10Y, 10M, 10C, and 10BK with laser beams L (serving as exposure light) based on the yellow, magenta, cyan, and black image data, respectively.

Meanwhile, the photoconductor drum 11 (see FIG. 2) in each of the four process cartridges 10Y, 10M, 10C, and 10BK rotates in a predetermined direction (i.e., counterclockwise in FIG. 2). A charging device 12 (see FIG. 2) uniformly charges a surface of the photoconductor drum 11 at a position facing each other (charging process). As a result, a charging potential is formed on the surface of the photoconductor drum 11. Subsequently, the surface of the photoconductor drum 11 charged reaches an irradiation position to receive the laser beam L. The writing device 2 emits laser beams L corresponding to four colors from four light sources according to the image data. The respective laser beams L pass through different optical paths for components of yellow, magenta, cyan, and black (exposure process).

The laser beam L for the yellow component is emitted to the surface of a first photoconductor drum 11 (serving as an image bearer) that is the first from the left among the photoconductor drums 11 of the four process cartridges 10Y, 10M, 10C, and 10BK in FIG. 1. A polygon mirror that rotates at high velocity deflects the laser beam L for yellow so that the laser beam L scans the surface of the photoconductor drum 11 along the rotation axis direction of the photoconductor drum 11 (i.e., the main scanning direction). Thus, an electrostatic latent image corresponding to the yellow component is formed on the photoconductor drum 11 charged by the charging device 12.

Similarly, the laser beam L for the magenta component is irradiated to the surface of a second photoconductor drum 11 of the process cartridge 10M that is the second from the left in FIG. 1, to form an electrostatic latent image for magenta thereon. The laser beam L corresponding to the cyan image data is irradiated to the surface of a third photoconductor drum 11 that is the third from the left in FIG. 1, to form an electrostatic latent image corresponding to the cyan image data. The laser beam L corresponding to the black image data is irradiated to the surface of a fourth photoconductor drum 11 that is the fourth from the left in FIG. 1, to form an electrostatic latent image corresponding to the black image data.

Then, the surfaces of the photoconductor drums 11 having the respective electrostatic latent images reach positions opposed to the corresponding developing devices 13 (see FIG. 2). The developing device 13 supplies toner of each color onto the surface of the photoconductor drum 11 and develops the electrostatic latent image on the photoconductor drum 11 into a visible toner image (development process). Subsequently, the surface of the photoconductor drum 11 after the development process reaches a position facing the intermediate transfer belt 17 (i.e., a primary transfer nip). The primary transfer rollers 16 are disposed at the positions where the photoconductor drums 11 face the intermediate transfer belt 17 and in contact with an inner circumferential surface of the intermediate transfer belt 17, respectively. At the positions of the primary transfer rollers 16, the toner images on the photoconductor drums 11 are transferred to and overlapped one on another on the intermediate transfer belt 17, to form a multicolor toner image on the intermediate transfer belt 17 (primary transfer process).

After the primary transfer process, the surface of the photoconductor drum 11 passes through a discharge lamp and reaches a position opposite a cleaning device 14 (see FIG. 2). At this position, a cleaning blade 14*a* (see FIG. 2) removes adhesive material on the photoconductor drum 11, such as toner (i.e., untransferred toner) adhering to the surface of the photoconductor drum 11, and the removed toner is collected into the cleaning device 14 (cleaning process). The untransferred toner collected into the cleaning device 14 is conveyed by a conveying screw 15*a* (see FIG. 2) toward the outside of the cleaning device 14, and is then collected into a waste-toner container as waste toner. Then, the surface of the photoconductor drum 11 passes through the discharge lamp, and a series of image forming processes performed on the photoconductor drum 11 ends.

On the other hand, the multicolor toner image is formed on the intermediate transfer belt 17 by transferring and overlapping the respective single-color toner images on the photoconductor drums 11. Then, the intermediate transfer belt 17 bearing the multicolor toner image moves clockwise in FIG. 1 to reach a position opposite the secondary transfer roller 18. The secondary transfer roller 18 transfers the multicolor toner image borne on the intermediate transfer belt 17 onto the sheet (secondary transfer process). After the secondary transfer process, the surface of the intermediate transfer belt 17, as an image bearer, reaches a position opposite the belt cleaning device 19. The belt cleaning device 19 collects untransferred toner (adhesive material) adhering to the intermediate transfer belt 17 by the cleaning blade 19*a*. Thus, a series of transfer processes performed on the intermediate transfer belt 17 ends.

The sheet is fed from the sheet feeder 7 via a registration roller pair 9 to a secondary transfer nip between the intermediate transfer belt 17 and the secondary transfer roller 18. More specifically, a sheet feed roller 8 feeds the sheet from the sheet feeder 7 that contains multiple sheets such as paper sheets, and the sheet is then guided by a conveyance guide to the registration roller pair 9 (serving as a timing roller pair). The sheet that has reached the registration roller pair 9 is conveyed toward the secondary transfer nip, timed to coincide with the arrival of the multicolor toner image on the intermediate transfer belt 17.

The sheet on which the multicolor toner image has been transferred is conveyed to the fixing device 20 by a conveyance belt. The fixing device 20 includes a fixing belt and a pressure roller pressing against each other to form a fixing nip. In the fixing nip, the multicolor toner image is fixed on the sheet. After the fixing process, an output roller pair ejects the sheet as an output image outside a main body of the image forming apparatus 1. Thus, a series of image forming processes ends.

With reference to FIG. 2, the process cartridge 10Y is described in further detail below. As illustrated in FIG. 2, in the process cartridge 10Y, the photoconductor drum 11 as the image bearer, the charging device 12 (charging roller), the developing device 13, and the cleaning device 14 are combined together as a single unit. The cleaning device 14 includes a toner conveying device 15.

The photoconductor drum 11 as the image bearer used in the present embodiment is an organic photoconductor to be charged to a negative polarity and includes a photosensitive layer formed on a drum-shaped conductive support member. For example, the photoconductor drum 11 is multilayered and includes a base layer serving as an insulation layer, the photosensitive layer, and a surface layer (i.e., a protection layer) are sequentially overlaid one on another on the conductive support member as a substrate. The photosensitive layer includes a charge generation layer and a charge transport layer. The photoconductor drum 11 is rotated counterclockwise in FIG. 2 by a drive motor.

With reference to FIG. 2, the charging device 12 is a charging roller including a conductive core and an elastic layer of moderate resistivity overlaid on the conductive core. The charging device 12 applies a predetermined voltage, which includes an alternating-current (AC) voltage superimposed on a direct-current (DC), from a charging power source and uniformly charges the surface of the photoconductor drum 11 facing the charging device 12.

The developing device 13 includes a developing roller 13*a* disposed opposite the photoconductor drum 11, a first conveying screw 13*b* disposed opposite the developing roller 13*a*, a second conveying screw 13*c* disposed opposite the first conveying screw 13*b* via a partition, and a doctor blade 13*d* disposed opposite the developing roller 13*a*. The developing roller 13*a* includes multiple magnets and a sleeve that rotates around the magnets. The magnets are stationary and generate magnetic poles around the circumference of the developing roller 13*a*. The magnets generate a plurality of magnetic poles on the developing roller 13*a* (sleeve) to bear a developer G on the developing roller 13*a*. The developing device 13 stores a two-component developer G including toner T and carrier C.

The cleaning device 14 includes the cleaning blade 14*a*, an inlet seal 14*b* as a sealing member, a toner conveying device 15, and so forth. The cleaning blade 14*a* contacts the photoconductor drum 11 as the image bearer and cleans the surface of the photoconductor drum 11. The toner conveying device 15 conveys the untransferred toner collected in the cleaning blade 14*a* in the width direction that is the axial direction of the photoconductor drum 11 and a direction perpendicular to a plane in which FIG. 2 is drawn.

The cleaning blade 14*a* is a plate-shaped member made of rubber material such as urethane rubber, and is supported in a cantilever structure by a supporting plate (held in a case of the cleaning device 14). The cleaning blade 14*a* contacts the surface of the photoconductor drum 11 at a predetermined angle and with a predetermined pressure. With this configuration, the adhesive material such as toner adhering to the surface of the photoconductor drum 11 are mechanically scraped off and collected into the cleaning device 14 by the cleaning blade 14*a*. Examples of the adhesive material adhering to the photoconductor drum 11 include paper dust arising from sheets, discharge products arising on the photoconductor drum 11 during electrical discharge by the charging device 12, and additives to toner. According to the present embodiment, the cleaning blade 14*a* contacts the photoconductor drum 11 against the direction of rotation of the photoconductor drum 11.

The inlet seal 14*b* as a sealing member is a substantially rectangular sheet-shaped member made of a rubber material such as polyurethane rubber, having flexibility, and having a thickness of about 0.05 to 0.15 mm. The inlet seal 14*b* is supported in a cantilever structure in a case of the cleaning device 14. The inlet seal 14*b* is in contact with the surface of the photoconductor drum 11 on a downstream side of the cleaning blade 14*a* in a rotation direction of the photoconductor drum 11. A flat surface of the inlet seal 14*b* is partially in contact with the surface of the photoconductor drum 11. The inlet seal 14*b* functions as a sealing member so that the toner (untransferred toner) collected in the cleaning device 14 does not leak outside.

Figure 3:
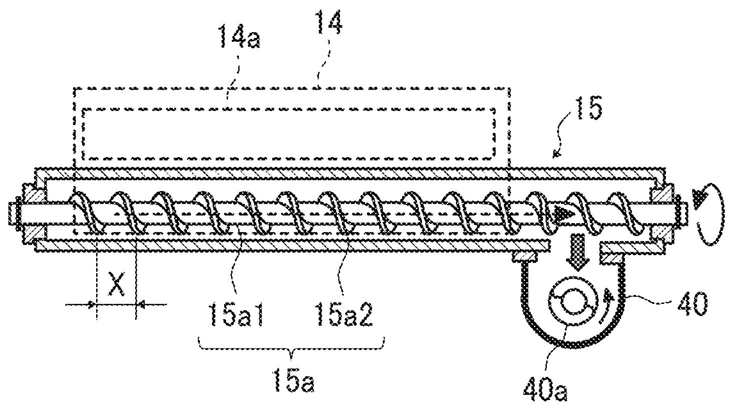
FIG. 3 is a schematic view of a toner conveying device in an axial direction.

As illustrated in FIGS. 2 and 3, the conveying screw 15*a* is provided in the toner conveying device 15. The conveying screw 15*a* includes a shaft portion 15*a*1 and a screw portion 15*a*2 spirally wound around the shaft portion 15*al*. The conveying screw 15*a* rotates in a predetermined direction to convey toner (adhesive material such as untransferred toner collected inside the cleaning device 14). When the conveying screw 15*a* is rotated in the direction indicated by arrows of FIGS. 2 and 3 by the drive motor, the toner in the cleaning device 14 is conveyed in the axial direction (i.e., a direction perpendicular to a plane on which FIG. 2 is drawn and a direction indicated by broken arrow in FIG. 3), and is discharged in a direction indicated by thick arrow in FIG. 3 toward a waste toner conveyance path 40 of the cleaning device 14. The toner discharged to the waste toner conveyance path 40 is conveyed and collected by the waste toner conveying screw 40*a* toward the waste toner container. The conveying screw 15*a* receives driving force from the drive motor to rotate the photoconductor drum 11 via a gear train, and is driven to rotate counterclockwise in FIG. 2 in conjunction with the rotation of the photoconductor drum 11. The conveying screw 15*a* includes the screw portion 15*a*2 that is formed with a pitch (screw pitch) X on the shaft portion 15*al*. In the present embodiment, a swinging member 15*b* (see FIG. 4) for preventing toner aggregation in the toner conveying device 15 (cleaning device 14) is disposed, but this embodiment will be described later in detail.

The image forming processes, described above, are described in further detail below with reference to FIG. 2. The developing roller 13*a* rotates clockwise indicated by arrow in FIG. 2. In the developing device 13, as the first and second conveying screws 13*b* and 13*c*, arranged via the partition, rotate as illustrated in FIG. 2, the developer G is circulated in the longitudinal direction of the developing device 13, being stirred with fresh toner T supplied from a toner supply unit 30 via the toner supply inlet. The longitudinal direction of the developing device 13 is perpendicular to the surface of the paper on which FIG. 2 is drawn. Thus, the toner T is triboelectrically charged and attracted to the carrier C. The toner T is borne on the developing roller 13*a* together with the carrier C. The developer G borne on the developing roller 13*a* reaches a position opposite the doctor blade 13*d*. After having been adjusted to an appropriate amount at the position of the doctor blade 13*d*, the developer G on the developing roller 13*a* then comes to an opposing position to the photoconductor drum 11 (i.e., a development area).

In the development area, the toner T in the developer G adheres to the electrostatic latent image on the photoconductor drum 11. The toner T adheres to the electrostatic latent image by a development electric field formed by a potential difference (i.e., a developing potential) between a latent image potential (i.e., an exposure potential) of an image area irradiated with the laser beam L and a developing bias applied to the developing roller 13*a*. Most of the toner T attached to the photoconductor drum 11 in the developing process is transferred onto the intermediate transfer belt 17. Untransferred toner T adhered (remained) on the surface of the photoconductor drum 11 is collected in the cleaning device 14 by the cleaning blade 14*a*. Subsequently, the surface of the photoconductor drum 11 passes through the position of the discharge lamp. After these processes, a series of image forming processes of the photoconductor drum 11 is completed.

The toner supply unit 30 of the image forming apparatus 1 (main body) includes a replaceable toner bottle 31 and a toner hopper 32. The toner hopper 32 holds and rotates the toner bottle 31 and supplies fresh toner T to the developing device 13.

Each toner bottle 31 contains fresh toner T (yellow toner in FIG. 2). Spiral projections are disposed on an inner circumferential surface of the toner bottle 31. The fresh toner T contained in the toner bottle 31 is supplied through the toner supply inlet to the developing device 13 as the toner T existing in the developing device 13 is consumed. The consumption of the toner T in the developing device 13 is detected either directly or indirectly using a magnetic sensor disposed below the second conveying screw 13*c* in the developing device 13.

Figure 4:
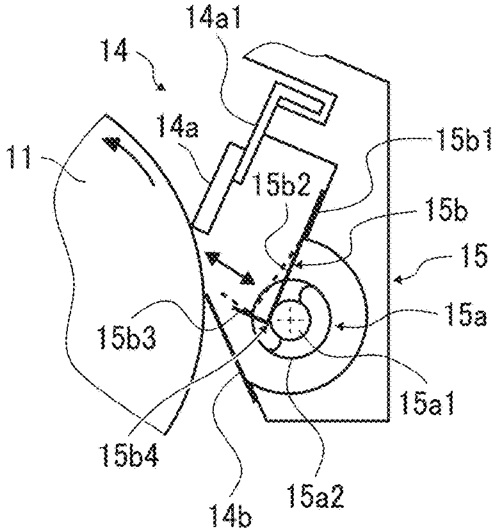
FIG. 4 is a cross-sectional view of a toner conveying device.

The configuration and operation of the toner conveying device 15 (cleaning device 14) according to the embodiment of the present disclosure are described below. As described above with reference to FIG. 2, the toner conveying device 15 includes a conveying screw 15*a* (screw portion 15*a*2 is spirally wound on the shaft portion 15*a*) which is rotated in the predetermined direction and conveys the toner. As illustrated in FIG. 4, in the present embodiment, the swinging member 15*b* formed in a substantially comb form is disposed in the toner conveying device 15 (the cleaning device 14). The swinging member 15*b* is a flexible sheet-shaped member made of PET (polyethylene terephthalate) and the forth, has a thickness of 0.075 to 0.5 mm, and is a swingable member that can swing between the shaft portion 15*a*1 and the screw portion 15*a*2 of the conveying screw 15*a*, with the rotation of the conveying screw 15*a*.

Specifically, as indicated by a double headed arrow in FIG. 4, a free end (a portion other than a supporting portion 15*b*1 supported by the case of the device) of the swinging member 15*b* repeatedly moves alternately between a position to contact the screw portion 15*a*2 (the position indicated by a broken line in FIG. 4) and a position to contact the shaft portion 15*a*1 (the position indicated by a solid line in FIG. 4), in accordance with the rotation cycle of the conveying screw 15*a*. This is because, when viewed from the side of the swinging member 15*b* (an overhanging portion 15*b*2 and a tip portion 15*b*3 described below), the shaft portion 15*a*1 and the screw portion 15*a*2 alternately appear at the opposite position of the swinging member 15*b* with the rotation of the conveying screw 15*a*. The swinging movement of the swinging member 15*b* can also referred to FIGS. 7A to 7D.

Figure 5:
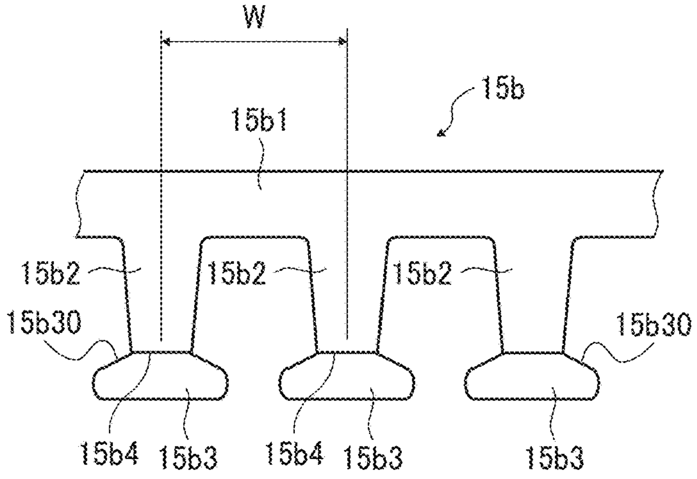
FIG. 5 is a schematic view of a swinging member in an axial direction.
Figure 6:
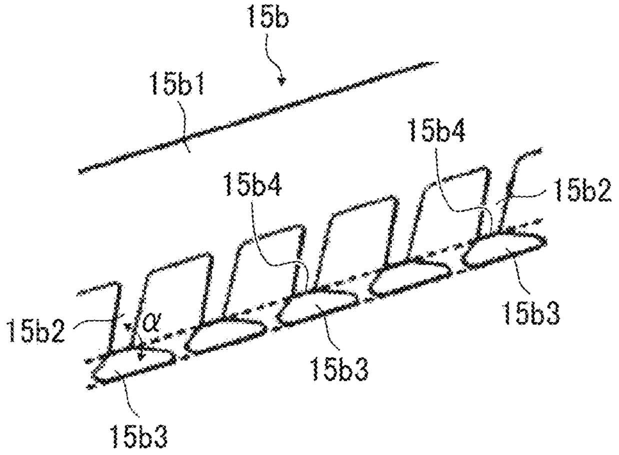
FIG. 6 is a perspective view of the swinging member.
Figure 8:
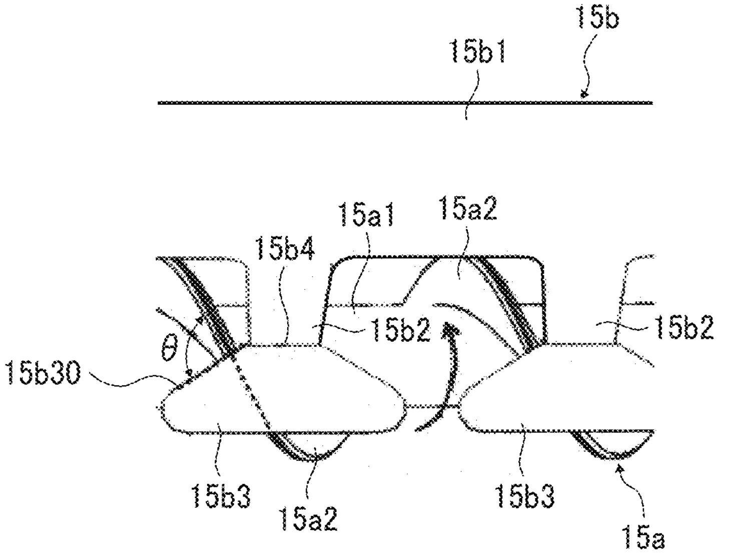
FIG. 8 is a schematic view illustrating a state in which the tip portion of the swinging member is in contact with the screw portion of the conveying screw.

Referring to FIGS. 5, 6, 8, and so forth, the swinging member 15*b* includes a plurality of overhanging portions 15*b*2, and a plurality of tip portions 15*b*3 (bending portions). The plurality of overhanging portions 15*b*2 are arranged at intervals with respect to the axial direction of the conveying screw 15*a*. Each of the plurality of tip portions 15*b*3 is bent at a predetermined angle α from the free end side (boundary portion 15*b*4) of the overhanging portion 15*b*2 in the direction away from the shaft portion 15*al*. The tip portion 15*b*3 of the swinging member 15*b* is formed so that the width of the tip portion 15*b*3 in the axial direction (which is the horizontal direction in FIG. 5 and the direction perpendicular to the plane on which FIG. 4 is drawn) gradually increases, at least, from a portion to contact the screw portion 15*a*2 toward the free end side.

In the present embodiment, the tip portion 15*b*3 of the swinging member 15*b* is formed so that the width of the tip portion 15*b*3 in the axial direction gradually increases from the boundary portion 15*b*4 with the overhanging portion 15*b*2 toward the free end side. More specifically, the tip portion 15*b*3 has side edges 15*b*30 extending from the boundary portion 15*b*4 with the overhanging portion 15*b*2 toward the free end side. Each of the side edges 15*b*30 is neither parallel nor perpendicular to the axial direction but continuously inclined in a direction approaching another tip portion **15*b*3 adjacent to the tip portion 15*b*3. As illustrated in FIG. 5, the plurality of overhanging portions 15*b*2 and the plurality of tip portions 15*b*3 are symmetrically formed, and are formed at a pitch W (≠X) different from the screw pitch X of the conveying screw 15*a*. The pitch W of the plurality of overhanging portions 15*b*2 and the plurality of tip portions 15*b*3 is different from the screw pitch X of the conveying screw 15*a*, so that the swinging movement of the plurality of tension portions 15*b*2 and the plurality of tip portions 15*b*3 does not occur at the same timing. In the present embodiment, the pitch W of the plurality of overhanging portions 15*b*2 and the plurality of tip portions 15*b*3 is formed so that the pitch W is larger than the screw pitch X of the conveying screw (W>X). As illustrated in FIG. 4, the overhanging portion 15*b*2 is longer than the span from the supporting portion 15*b*1 (the portion attached to the case of the cleaning device 14) to the shaft portion 15*a*1. Furthermore, the width of the overhanging portion 15*b*2** is shorter than the screw pitch X described above.

As illustrated in FIGS. 7A to 7D, the swinging member **15*b* thus configured swings so as to alternately contact the shaft portion 15*a*1 and the screw portion 15*a*2, and reduces the failure of toner agglomeration in the toner conveying device 15 (or the cleaning device 14**).

Figure 7A:
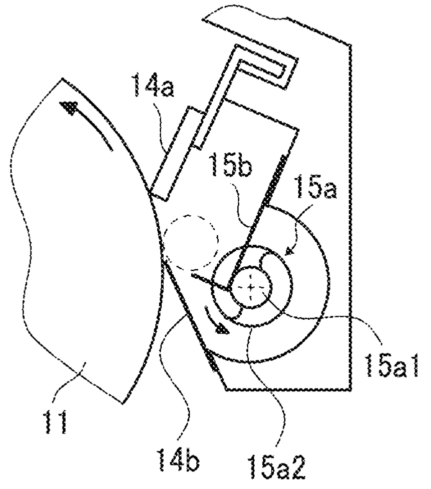
FIGS. 7A to 7D are schematic views illustrating an operation of the swinging member.
Figure 7B:
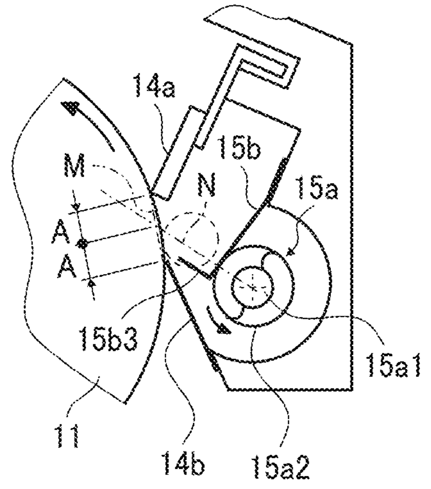
Figure 9A:
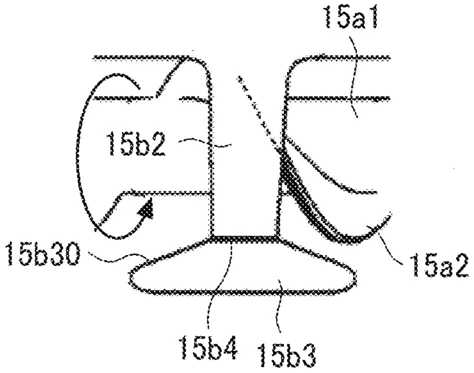
FIG. 9A is a schematic view illustrating a state in which an overhanging portion of the swinging member is in contact with a shaft portion of the conveying screw.

As illustrated in FIG. 7A and FIG. 9A, the swinging member **15*b* is in a state in which the swinging member 15*b* is in contact with the shaft portion 15*a*1 of the conveying screw 15*a* (or in a state close to the shaft portion 15*a*1). As the rotation of the conveying screw 15*a* advances, as illustrated in FIG. 7B, the overhanging portion 15*b*2 of the swinging member 15*b* comes into contact with the screw portion 15*a*2 (outer peripheral portion) of the conveying screw 15*a*. At this time, the tip portion 15*b*3 of the swinging member 15*b* is closest to an area indicated by the broken line in FIGS. 7A and 7B and loosen the toner in the area (to prevent toner agglomeration in the area. The area is close to the photoconductor drum 11 and far from the conveying screw 15*a*. Toner is likely to stay and agglomerate in the area. In the present embodiment, since the tip portion 15*b*3 is wider than the overhanging portion 15*b*2**, the effect of loosening the toner is easily achieved.

Figure 7C:
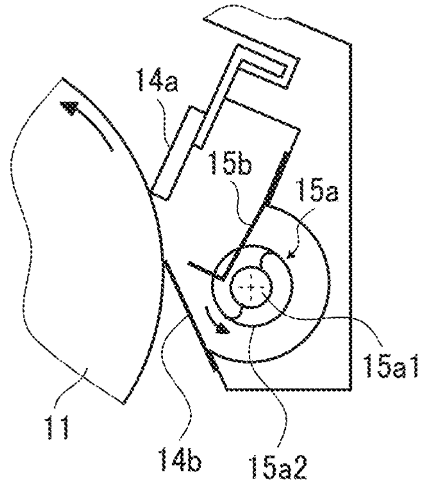
Figure 9B:
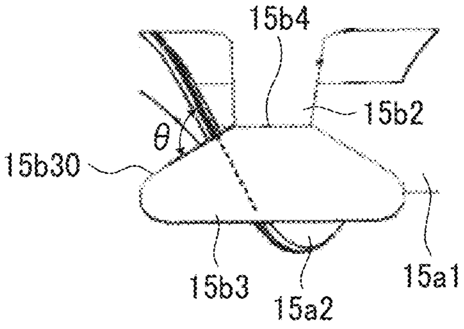
FIG. 9B is a schematic view illustrating a state in which the tip portion of the swinging member is in contact with the screw portion of the conveying screw.

Further, as the rotation of the conveying screw **15*a* proceeds from the state, as illustrated in FIG. 7C, FIG. 8, and FIG. 9B, the tip portion 15*b*3 of the swinging member 15*b* comes into contact with the screw portion 15*a*2 (outer peripheral portion) of the conveying screw 15*a*. At this time, since the tip portion 15*b*3 is formed so that the width of the tip portion 15*b*3 gradually increases at least from the portion to contact the screw portion 15*a*2 toward the free end side, the tip portion 15*b*3 and the screw portion 15*a*2 (outer peripheral portion) intersect the predetermined intersection angle θ. Accordingly, the swinging member 15*b* (the tip portion 15*b*3) is less likely to be caught in the conveying screw 15*a* than in the case that the above-described intersection angle θ is not generated. As a result, such a failure that the device is locked by the entrainment of the swinging member 15*b* or that the swinging member 15*b*** is broken are restrained.

Figure 7D:
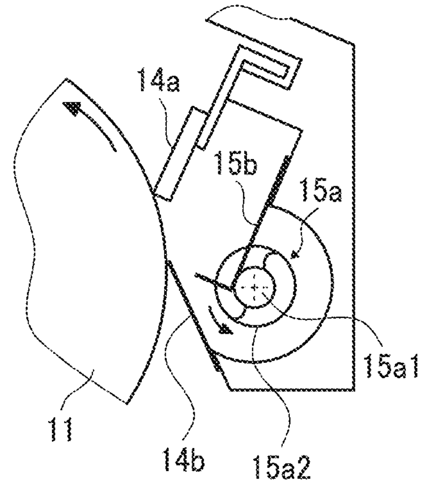

Further, as the rotation of the conveying screw **15*a* proceeds from the state, as illustrated in FIG. 7D and FIG. 9A, the tip portion 15*b*3 of the swinging member 15*b* comes into contact with (or approaches) the shaft portion 15*a*1 of the conveying screw 15*a*. Thereafter, the operation of the swinging member 15*b* described in FIGS. 7A to 7D is repeated in accordance with the rotation cycle of the conveying screw 15*a*. Such a configuration can prevent the swinging member 15*b* from being caught in the conveying screw 15*a* and reduce the failure in which toner agglomerates in the cleaning device 14**.

Referring to FIG. 8 and FIG. 9B, in the present embodiment, the tip portion **15*b*3 of the swinging member 15*b* is formed so that each of the side edges 15*b*30, which extends from the boundary portion 15*b*4 with the overhanging portion 15*b*2 toward the free end side, contacts the screw portion 15*a*2 at approximately 90 degrees from the screw portion 15*a*2. As illustrated in FIG. 7C, when the tip portion 15*b*3 comes into contact with the outer peripheral portion of the screw portion 15*a*2, the intersection angle θ is set to be approximately 90 degrees. Such a configuration can more easily achieve an effect that the swinging member 15*b* (or the tip portion 15*b*3) is less likely to be caught in the conveying screw 15*a*. Note that the intersection angle θ is preferably approximately 90 degrees, but may be set to an angle (for example, about 30 degrees) that is not too small, in other words, an angle at which the swinging member 15*b* (or the tip portion 15*b*3) is not caught in the screw portion 15*a*2**.

Referring to FIG. 6 and so forth, in the present embodiment, the tip portion **15*b*3 of the swinging portion 15*b* is bent at approximately 90 degrees from the free end side (boundary portion 15*b*4) of the overhanging portion 15*b*2 in a direction away from the shaft portion 15*al*. That is, a bending angle α of the tip portion 15*b*3 is set to approximately 90 degrees. In such a configuration, as illustrated in FIG. 7B, the tip portion 15*b*3, which moves to the area surrounded by the broken line (area in which the agglomerated toner is likely to be generated), is less likely to be bent by the pressure of toner. Thus, an effect of loosening the toner is likely to be achieved. Further, the bending process of the swinging member 15*b* at the time of forming the tip portion 15*b*3** is simplified (and the workability of the bending is enhanced).

In the present embodiment, the swinging member **15*b* is formed so as to contact the conveying screw 15*a* along the axial direction. The swinging member 15*b* is disposed across the entire range in the axial direction of the conveying screw 15*a* illustrated in FIG. 3. Such a configuration can reduce toner agglomeration across the entire range in the axial direction in which toner is conveyed by the conveying screw 15*a***.

Referring to FIG. 7B, in the present embodiment, when the tip portion **15*b*3 of the swinging member 15*b* is closest to the photoreceptor drum 11 (in other words, moves to a swinging position farthest from the shaft portion 15*a*1), the tip portion 15*b*3 is substantially parallel to a virtual line N passing through the axial center of the shaft portion 15*a*1 and the center of a virtual line segment M connecting the contact position between the photoconductor drum 11 and the cleaning blade 14*a* and the contact position between the photoconductor drum 11 and the inlet seal 14*b*, when viewed in a cross section perpendicular to the axial direction. Note that the center of the virtual line segment M is at a position equidistant with a distance A from both ends of the virtual line segment M. In such a configuration, as illustrated in part (b) of FIG. 7A, the tip portion 15*b*3**, which moves to the area surrounded by the broken line (area in which agglomerated toner is likely to be generated), is less likely to be bent by the pressure of toner. Thus, an effect of loosening toner is likely to be achieved.

Referring to FIG. 4 and so forth, in the present embodiment, the supporting surface **14*a*1 of the cleaning blade 14*a* (the case surface on which the supporting plate of the cleaning blade 14***a* is fixed) and the supporting surface of the swinging member 15*b* (the case surface on which the supporting portion 15*b*1 of the cleaning blade 14*a* is affixed) are substantially parallel. In such a configuration, when the cleaning device 14 in which the toner conveying device 15 is installed is assembled in a manufacturing plant, the workability of assembling the cleaning blade 14*a* extending in the axial direction and the swinging member 15*b* is improved.

As described above, the swinging member 15*b* in the present embodiment is formed so that the overhanging portion 15*b*2 and the tip portion 15*b*3 are symmetrical in a direction perpendicular to the axial direction of the swinging member 15*b*. Therefore, in order to prevent the entrainment of the cleaning blade 14*a* to the photoconductor drum 11, even when a "reverse mode" in which the photoconductor drum 11 is rotated in the reverse direction for a short time during non-image formation is performed and the transport screw 15*a* is also rotated in the reverse direction accordingly, the tip portion 15*b*3 of the swinging member 15*b* is less likely to caught in the conveying screw 15*a* for the same reason as in the normal rotation. Accordingly, a drive lock of the cleaning device 14 and a damage of the swinging member 15*b* are also prevented.

As described above, the toner conveying device 15 (or the cleaning device 14) in the present embodiment includes the conveying screw 15*a* and the swinging member 15*b*. The conveying screw 15*a* has the shaft portion 15*a*1 and the screw portion 15*a*2 spirally wound around the shaft portion 15*al*, and rotates in the predetermined direction to convey toner. The swinging member 15*b* is formed in a substantially comb form and can swing between the shaft portion 15*a*1 and the screw portion 15*a*2 with the rotation of the conveying screw 15*a*. The swinging member 15*b* includes the plurality of overhanging portions 15*b*2 and the plurality of tip portions 15*b*3. The plurality of overhanging portions 15*b*2 are arranged side by side at intervals in the axial direction of the conveying screw 15*a*. Each of the plurality of tip portions 15*b*3 is bent at a predetermined angle α from the free end of the corresponding overhanging portion 15*b*2 in a direction away from the shaft portion 15*al*. The tip portion 15*b*3 of the swinging member 15*b* is formed so that the width of the tip portion 15*b*3 in the axial direction of the swinging member 15*b* gradually increases at least from the portion to contact the screw portion 15*a*2 toward the free end side. Such a configuration can prevent the swinging member 15*b* from being caught in the conveying screw 15*a* and reduce the failure that toner agglomerates in the cleaning device 14.

In the above-described embodiments, the respective components (i.e., the photoconductor drum 11, the charging device 12, the developing device 13, and the cleaning device 14) of the image forming unit are combined together as the process cartridge 10 (i.e., the process cartridge 10BK) to make the image forming unit compact and to facilitate maintenance work. Alternatively, the cleaning device 14 may not be included in the process cartridge and can be independently installed (removably) in the image forming apparatus 1 (main body). In such a configuration, similar effects to those of the above-described embodiment and variations are also attained. It is to be noted that the term "process cartridge" used in the present disclosure means a removable unit including an image bearer and at least one of a charging device to charge the image bearer, a developing device to develop latent images on the image bearer, and a cleaning device to clean the image bearer that are united together, and is designed to be removably installed as a united part in the image forming apparatus 1 (main body).

In the above-described embodiment, the present disclosure is applied to the toner conveying device 15 included in the cleaning device 14 to remove the adhesive material on the photoconductor drum 11 as an image bearer. By contrast, the present disclosure is applied to the toner conveying device 15 included in the belt cleaning device 19 to remove the adhesive material on the intermediate transfer belt 17 as an image bearer. In the above-described embodiments, the present disclosure is applied to the toner conveying device 15 (the cleaning device 14) included in the image forming apparatus 1 that performs multicolor image formation. Alternatively, the present disclosure can also be applied readily to the toner conveying device 15 (the cleaning device 14) included in a monochrome image forming apparatus. In the above-described embodiment, the present disclosure is applied to the toner conveying device 15 included in the cleaning device 14, but the application of the present disclosure is not limited thereto, and, for example, the present disclosure can be applied to all of the toner conveying device that conveys toner (including waste toner, and new toner or recycled toner, etc.), even in the toner conveying device 15 included in the developing device 13 and the toner supply unit 30. Such cases also provide substantially the same effects as the effects described above.

Note that embodiments of the present disclosure are not limited to the above-described embodiments and it is apparent that the above-described embodiments can be appropriately modified within the scope of the technical idea of the present disclosure in addition to what is suggested in the above-described embodiments. Further, the number, position, shape, and so on of components are not limited to those of the present embodiment, and may be the number, position, shape, and so on that are suitable for implementing the present disclosure.

This patent application is based on and claims priority to Japanese Patent Application No. 2020-012458, filed on Jan. 29, 2020, in the Japan Patent Office, the entire disclosure of which is hereby incorporated by reference herein.

REFERENCE SIGNS LIST

- 1 Image forming apparatus (Main body of Image forming apparatus)
- 10Y Process cartridge (Yellow)
- 10M Process cartridge (Magenta)
- 10C Process cartridge (Cyan)
- 10BK Process cartridge (Black)
- 11 Photoconductor drum (Image bearer)
- 14 Cleaning device
- 14*a* Cleaning blade
- 14*b* Inlet seal (Seal member)
- 15 Toner conveying device
- 15*a* Conveying screw
- 15*a*1 Shaft portion
- 15*a*2 Screw portion
- 15*b* Swinging member (Agitator)
- 15*b*1 Supporting portion
- 15*b*2 Overhanging portion
- 15*b*3 Tip portion
- 15*b*4 Boundary portion
- 15*b*30 Side end
- M Virtual line segment
- N Virtual line

The invention claimed is:

1. A toner conveying device comprising:

a conveying screw configured to rotate and convey toner, the conveying screw including:

a shaft portion; and a screw portion spirally wound around the shaft portion; and a swinging member having a comb shape, the swinging member configured to swing between the shaft portion and the screw portion with rotation of the conveying screw, the swinging member including:

a plurality of overhanging portions arranged side by side at intervals in an axial direction of the conveying screw; and a plurality of tip portions, each tip portion of the plurality of tip portions being bent at an angle from a free end side of a corresponding one of the plurality of overhanging portions in a direction away from the shaft portion, wherein each tip portion of the plurality of tip portions includes side edges on an upstream side and downstream side in the toner conveying direction, a width of the side edges gradually increasing least from a portion contacting the screw portion toward a free end side of each of the plurality of tip portions.

2. The toner conveying device according to claim 1, wherein each tip portion includes a boundary portion with the corresponding one of the plurality of overhanging portions, and wherein the width of each tip portion gradually increases from the boundary portion toward the free end side of each one of the plurality of tip portions.

3. The toner conveying device according to claim 2, wherein the side edges are configured to contact the screw portion at a 90 degree angle between the side edges and the screw portion.

4. The toner conveying device according to claim 1, wherein each tip portion is bent at 90 degrees from the free end side of the corresponding one of the plurality of overhanging portions in the direction away from the shaft portion.

5. The toner conveying device according to claim 1, wherein the swinging member is configured to contact the conveying screw along the axial direction.

6. A cleaning device comprising the toner conveying device according to claim 1.

7. The cleaning device according to claim 6, further comprising:

a cleaning blade configured to contact an image bearer configured to rotate in a rotation direction; and a seal configured to contact the image bearer on an upstream side from the cleaning blade in the rotation direction, wherein tip portions, of the plurality of tip portions, when at a position closest to the image bearer are configured to be substantially parallel to a virtual line passing through a center of the shaft portion in the axial direction and a center of a virtual line segment connecting a contact position between the image bearer and the cleaning blade and a contact position between the image bearer and the seal, when viewed along the axial direction.

8. A process cartridge configured to be detachably installed in an image forming apparatus, the process cartridge comprising:

the cleaning device according to claim 6; and an image bearer integrated with the cleaning device.

9. The toner conveying device according to claim 1, further comprising:

a cleaning blade configured to contact an image bearer configured to rotate in a rotation direction, wherein the swinging member is a flexible sheet-shaped member, and wherein a supporting face of the cleaning blade is substantially parallel to a supporting face of the swinging member.

10. An image forming apparatus comprising the toner conveying device according to claim 1.

11. The toner conveying device according to claim 1, wherein a pitch between the plurality of overhanging portions and the plurality of tip portions is different from a screw pitch of the conveying screw.

12. The toner conveying device according to claim 1, wherein a pitch between the plurality of overhanging portions and the plurality of tip portions is greater than a screw pitch of the conveying screw.

13. The toner conveying device according to claim 1, wherein a length of the plurality of overhanging portions is greater than a span from a supporting portion of the conveying screw to the shaft portion.

14. The toner conveying device according to claim 1, wherein a width of the plurality of overhanging portions is less than a screw pitch of the conveying screw.

15. The toner conveying device according to claim 1, wherein each of the plurality of tip portions is symmetrical with a corresponding overhanging portion, of the plurality of overhanging portions, in a direction perpendicular to an axial direction of the swinging member.

16. The toner conveying device according to claim 1, wherein the swinging member extends along an entire range of the conveying screw in the axial direction.

* * * * *